US011186504B2

(12) United States Patent
    Gerards

(10) Patent No.: US 11,186,504 B2
(45) Date of Patent: Nov. 30, 2021

(54) WASTE WATER TREATMENT PLANT

(71) Applicant: WATERLEAU GROUP NV, Wespelaar (BE)

(72) Inventor: Ron Gerards, Attenhoven (BE)

(73) Assignee: WATERLEAU GROUP NV, Wespelaar (BE)

( * ) Notice: Subject to any disclaimer, the term of this patent is extended or adjusted under 35 U.S.C. 154(b) by 0 days.

(21) Appl. No.: 16/495,722

(22) PCT Filed: Mar. 23, 2018

(86) PCT No.: PCT/EP2018/057489
    § 371 (c)(1),
    (2) Date: Sep. 19, 2019

(87) PCT Pub. No.: WO2018/172535
    PCT Pub. Date: Sep. 27, 2018

(65) Prior Publication Data
    US 2020/0095145 A1    Mar. 26, 2020

(30) Foreign Application Priority Data
    Mar. 24, 2017   (EP) ..................................... 17162842

(51) Int. Cl.
    *C02F 3/12*     (2006.01)
    *B01D 21/00*    (2006.01)
    *B01D 21/02*    (2006.01)
    *B01D 21/24*    (2006.01)
    (Continued)

(52) U.S. Cl.
    CPC ........ *C02F 3/1263* (2013.01); *B01D 21/0024* (2013.01); *B01D 21/0048* (2013.01); *B01D 21/0063* (2013.01); *B01D 21/02* (2013.01); *B01D 21/2444* (2013.01); *C02F 3/282* (2013.01); *C02F 2001/007* (2013.01); *C02F 2203/006* (2013.01)

(58) Field of Classification Search
    CPC ........... B01D 21/0039; B01D 21/0042; B01D 21/2444; B01D 17/0211; B01D 17/0208; B01D 21/0051; C02F 3/1263
    USPC .................................................. 210/521, 802
    See application file for complete search history.

(56) References Cited

U.S. PATENT DOCUMENTS

| 4,596,658 A | * | 6/1986 | Mandt | ................... | C02F 3/1263 |
|             |   |        |       |                    | 210/626     |
| 5,028,333 A | * | 7/1991 | Wright | ............... | B01D 21/0003 |
|             |   |        |       |                    | 210/521     |

(Continued)

FOREIGN PATENT DOCUMENTS

| CN | 101475294 A    | 7/2009  |
|----|----------------|---------|
| DE | 19957570 A1    | 5/2001  |
| EP | 0338182 A1     | 10/1989 |

(Continued)

*Primary Examiner* — Claire A Norris
(74) *Attorney, Agent, or Firm* — Maschoff Brennan

(57) ABSTRACT

The invention relates to a waste water treatment plant including at least a multi-step water treatment reactor arranged for receiving influent waste water, for carrying out at least a biological step and a sedimentation step and for providing effluent pure water, by means of an effluent weir. The wastewater treatment plant further includes means for increasing the sedimentation velocity, and means for hindering floating elements to get into the effluent weir.

20 Claims, 3 Drawing Sheets

(51) Int. Cl.
*C02F 3/28* (2006.01)
*C02F 1/00* (2006.01)

(56) References Cited

U.S. PATENT DOCUMENTS 5,736,037 A * 4/1998 Meurer .............. B01D 21/0003
 210/232
2003/0038080 A1 * 2/2003 Vriens ..................... C02F 3/121
 210/605

FOREIGN PATENT DOCUMENTS

| EP | 1259465 A1 | 11/2002 |
| GB | 2046609 A | 11/1980 |
| WO | 8200134 A1 | 1/1982 |

* cited by examiner

WASTE WATER TREATMENT PLANT

The invention relates to a multi-step water treatment plant being a cyclic operating activated sludge system.

BACKGROUND OF THE INVENTION

Waste water which is produced everyday by domestic or industrial activities must be purified from both organic and inorganic materials. This purification activity is generally centralized in large plants, waste water treatment plants, in segregated locations. The principle of this purification is generally organized in several steps, of which:
- a biological step of mixing the wastewater with an activated mass of micro-organisms (activated sludge), under aerobic, anaerobic or anoxic conditions, that will be fed by the impurities which are decomposed into water, carbon dioxide and constitutive organic material for the growth and reproduction of the micro-organisms;
- a step of decantation/sedimentation of the mass of micro-organisms to enable collection of the purified water as supernatant.

Traditionally, these steps are carried out in separate tanks, with a complex network of pipes and valves, which is usually installed underground. This type of wastewater treatment plant has a very high footprint (or surface), as the sedimentation tanks are usually large circular tanks, and the large network of pipes and valves requires extensive maintenance.

It has been developed some years ago a new design for waste water treatment plants that enable to carry out all the steps of water treatment in a single reactor or in a multiple reactor set-up where each reactor (or compartment) is able to carry out all the steps of the process, in particular the steps of reaction with micro-organisms and sedimentation. This is disclosed in patent EP1259465.

This type of installation is much compacter than traditional installations with wide circular sedimentation tanks. Maintenance is also much simpler, resulting in much lower operating costs.

The system of EP1259465 operates along different phases, with active phases and intermediates phases in a multi-step water treatment reactor. A reactor can for example be in turn a sedimentation reactor and a biological reactor, each of these functions corresponding to an active phase. The period between two active phases, while the function of the reactor is switched is an intermediate phase. The alternation of phases enables a continuous cycle of purification to run. As mentioned in this document, the duration of an intermediate phase is always minimized, and the time needed is depending on the mass sedimentation velocity. The better the sedimentation capacity, the shorter the intermediate phase and the higher the active time of the system.

However, it is often observed that due to the compact configuration of the reactors (small surface, high depth), the sedimentation time is not optimal. There is therefore a need to improve the capacity of the sedimentation step. Cross lamellas are known, wherein sedimentation channels or tubes are arranged crossed according to an "X" pattern, contrary to cross-flow lamellas, wherein channels are arranged parallel. The cross lamellas allow to reduce the turbulence in a fluid reactor and increases the surface area of the separator by a factor of two to three and, hence, increases the velocity of sedimentation in water treatment processes. Compared to standard lamella separators (one direction lamella clarifiers), the cross lamella separator has the advantage of being much more stable and resistant to the water turbulence, which means it is not pushed in any particular horizontal direction by a flow of water and it can sustain the upstream vertical air/water force during the aeration phase. This also results in a higher efficiency in sedimentation processes, while reducing the tank surface area.

However, because of the cross lamella, the concentration of floating elements increases, this somehow already being the case with standard lamellas. Thus, in solving a problem—with the lamellas, another problem is getting worse—the floating elements.

The object of the invention is to solve both problems simultaneously.

SOLUTION OF THE INVENTION

To this end, the invention relates to a waste water treatment plant comprising at least a multi-step water treatment reactor arranged for receiving influent waste water, for carrying out at least a biological step and a sedimentation step and for providing effluent pure water, by means of an effluent weir, characterized in that lamellas are provided within the reactor for increasing sedimentation velocity and the weir is combined with a cover for providing a baffle hindering floating elements to get through and not the pure water.

There are means for increasing the sedimentation velocity other than lamellas and there are means for hindering the floating elements to get out of the reactor through the effluent weir other than the baffle, so the applicant wants to extend the scope of the protection to a water treatment plant comprising at least a multi-step water treatment reactor arranged for receiving influent waste water, for carrying out at least a biological step and a sedimentation step and for providing effluent pure water, by means of an effluent weir, characterized in that there are provided
- means for increasing the sedimentation velocity, and
- means for hindering floating elements to get into the effluent weir.

The multi-step water treatment is here a cyclic operating activated sludge system, as described above.

In one embodiment, the reactor may include a single biological/sedimentation compartment.

In a preferred embodiment, the reactor is divided in several connected compartments, each arranged for carrying out a biological step and/or a sedimentation step and including a baffle, the compartments being connected in the bottom section of the reactor.

In an advantageous configuration, each compartment may be provided with means for putting its baffle under gas pressure to avoid flow of the effluent out of the compartment.

This pressure of gas ensures that no floating elements or impurities will contaminate the effluent weir, during the biological steps, when turbulences are present in the reactor. With this feature, there is no need to rinse the weir during the intermediate phase prior to collecting the clean effluent water. This also participates in reducing the duration between two active phases.

In another embodiment, the weir and the cover have each an L-shaped crossed section arranged top to bottom.

Preferably, the lamellas are cross-lamellas.

The invention will be better understood with the following description of several examples, referring to the accompanying drawing on which:

Figure 1:
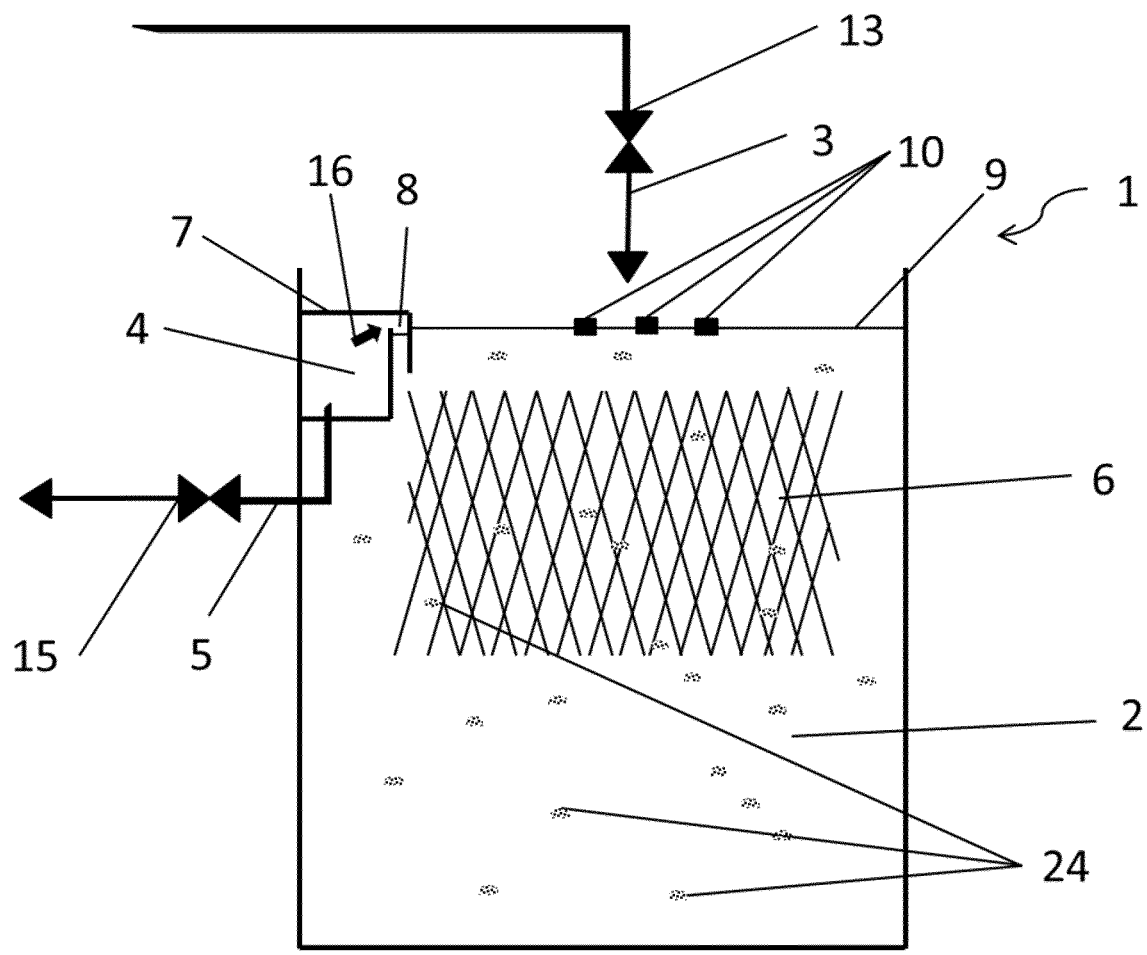
FIG. 1 illustrates a compartment of a multi-step water treatment reactor of the invention running a biological step.

In reference with FIG. 1, the multi-step water treatment reactor 1 has a compartment 2 with an influent waste water inlet pipe 3 equipped with a control valve 13 and an effluent weir 4 linked to effluent pipe 5 equipped with a control valve 15. A set of cross lamella 6 are provided within the compartment 2 and the cover 7 overlaps the weir 4 forming a baffle 8 and a pressure of gas 16 is applied inside the weir 4. In this configuration, the compartment is in a biological step. Compartment 2 is filled with water, micro-organisms 24 are scattered in small fractions and floating elements 10 are often present at the surface 9 of the water.

Figure 2:
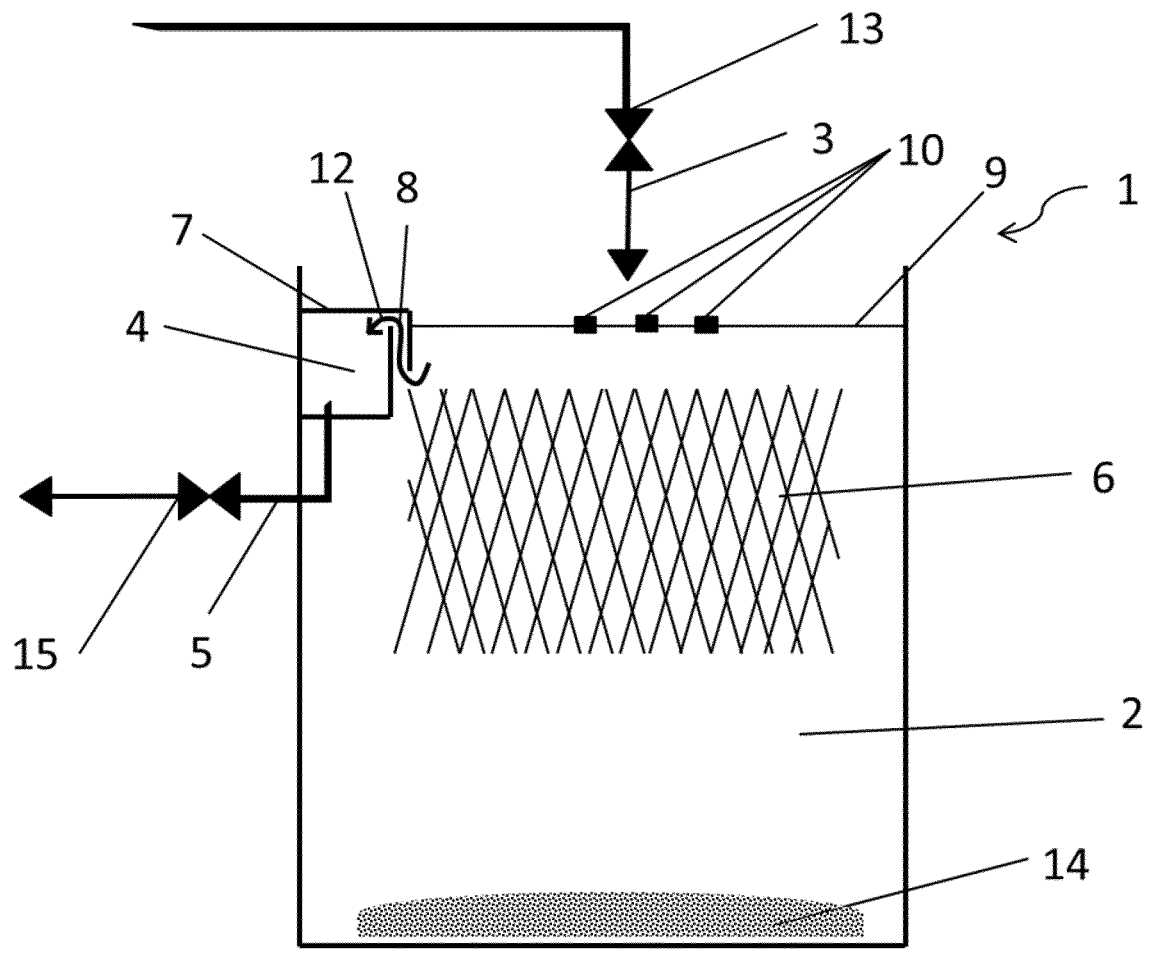
FIG. 2 illustrates a compartment of a multi-step water treatment reactor of the invention running sedimentation step and FIG. 3 illustrates a multi-step water treatment reactor of the invention combining several biological/sedimentation compartments.

In reference with FIG. 2, the compartment 2 illustrated by FIG. 1 is now in a sedimentation step, a mass of micro-organisms 14 is present at the bottom of the reactor and cleaned water is flowing from reactor 2 through baffle 8 and into weir 4, as illustrated by the arrow 12.

Influent waste water is water (organic and inorganic materials), usually released by domestic or industrial activities and containing soluble impurities, which presence is not desired in the water circuit. The impurities are removed during the water treatment process to give effluent pure water.

An effluent weir is a type of groove or gutter incorporated in or attached to the compartment of a reactor and designed in such a way that only the upper layer of the water in the compartment can overflow into the weir. The weir is usually adjoined to the side wall of the compartment, but may be located anywhere at the surface of water in the compartment. The effluent weir is connected to outflow pipes. Typically, the effluent weir is used in the water treatment process, during or at the end of the sedimentation step, to enable the effluent pure water, which is free from the micro-organisms that have been separated in the sedimentation process, to flow out of the reactor.

Floating elements are insoluble materials with low specific weight that accumulate at the surface of the water in the reactor, during the water treatment process. The floating elements are not targeted in the biological steps of the water treatment process, they can even be at least in part produced during the biological step, for example dead micro-organisms can form floating elements. In particular, although municipal waste water is pretreated by a sand and fat removal device, some partially dissolved fat can still enter the biological reactors. There, the fat tends to attach to micro-organisms flocks and create unwanted floating particles. The air bubbles circulating in the tank during the aeration phase even enhance the rise to the surface of these complexes of fat with microorganism. Usually, separate means are involved to remove these elements, like skimming devices.

A mass of micro-organisms or activated sludge consists mostly of a mass of bacteria. The exact nature of the micro-organisms can be adapted to the nature of the impurities to remove, as well as the conditions operated in the reactor (aerobic, anaerobic or anoxic).

In practice, the compartment 2 is filled with influent waste water by opening the valve 13 on pipe 3. A biological step is ran to purify this influent waste water by action of micro-organisms 24 under stirring (not illustrated). Additional aeration may also be applied in the case where the micro-organisms work under aerobic conditions. During this step, a number of floating elements 10 are often accumulating at the surface 9 of the water in the compartment. Because of the decreased surface/volume ratio, the presence of the cross lamella 6 in this step tends to increase the amount of such floating elements 10 which are hindered from going into the weir 4 by the baffle 8, formed between the weir 4 and its cover 7.

During this step, a pressure of gas 16 may be applied in the weir 4 which will further hinder water from flowing through the baffle 8 and contaminate the weir with impurities. This is particularly convenient when stirring and/or aeration create turbulence in the compartment 2.

At the end of the biological step, stirring, and in such a case aeration are stopped and, after an intermediate phase of switching activities if needed, a sedimentation step begins: the micro-organisms 24 gravitationally move towards the bottom of the compartment 2 to form a mass of micro-organisms 14. The set of cross lamella 6 increases the sedimentation velocity.

The sedimentation velocity is the speed at which sedimentation will occur. Sedimentation is the process of separation by gravity of the mass of micro-organisms 14 from the water. The mass accumulates at the bottom, while the purest water is at the top of the reactor compartment.

If applied, the pressure of gas 16 is then released and the valve 15 is open, allowing the pure water towards its surface to flow through the baffle 8 into the weir 4 and into effluent pipe 5, while the floating elements 10 are hindered from flowing along by the cover 7 which extends below the level of the surface 9 of the water.

Such a configuration of the weir 4 forming a baffle 8 with cover 7 is very convenient to isolate an effluent channel, in which a pressure of gas, usually air, can be applied thus preventing contamination of the weir by both the floating elements and also projections of waste water contaminated with micro-organisms, which may occur with the turbulences generated by stirring and/or aeration. In reactors where such effluent channel is not present, it is necessary to rinse the weir between a biological step and a sedimentation step to ensure that pure effluent water is not contaminated. The baffle 8 therefore additionally enables to save resources, namely time and rinsing means.

Figure 3:
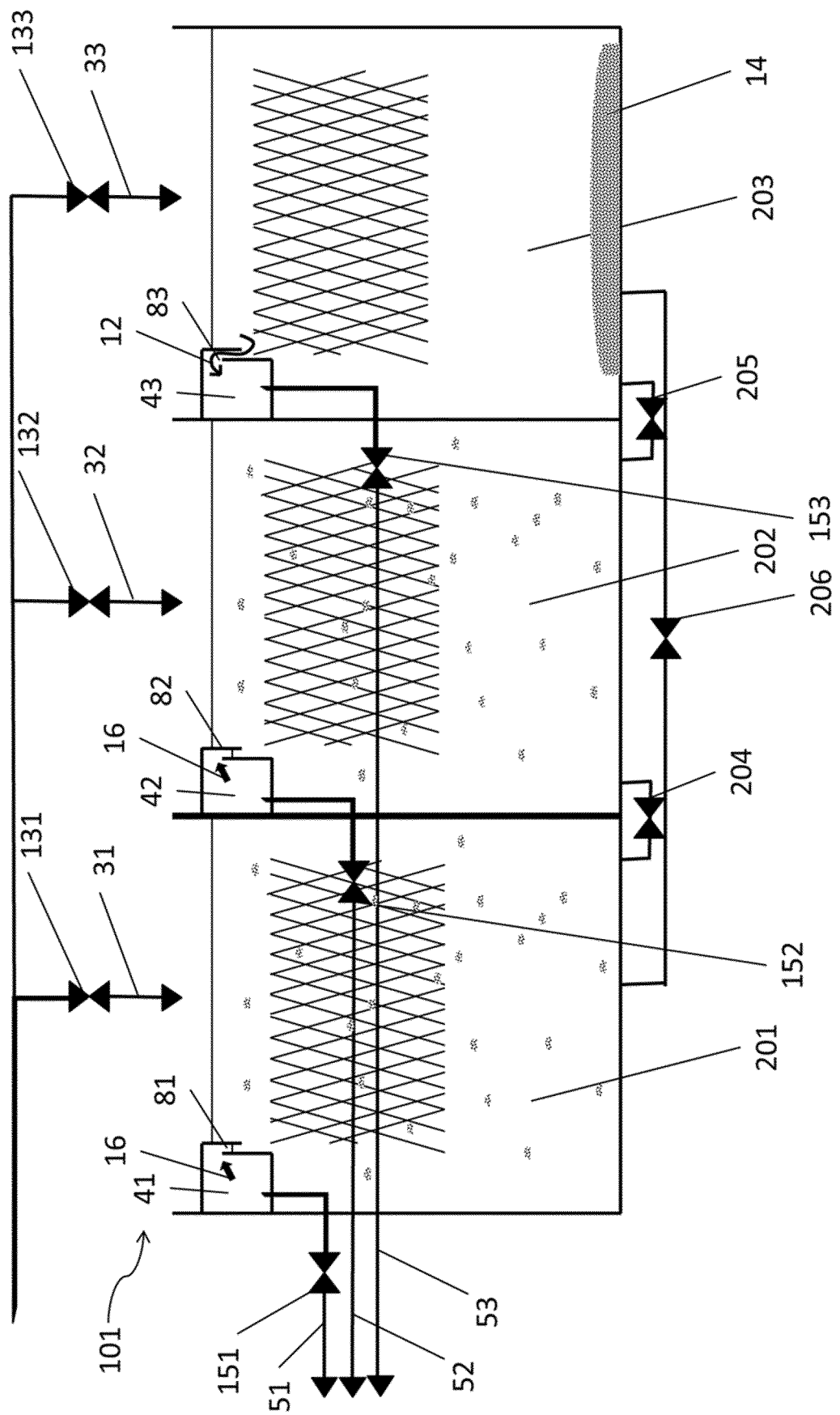

The compartment 2 can be either functioning alone, or be connected to other similar compartments, running a biological or a sedimentation step, with pipes equipped with control valves, as described for example in EP1259465. FIG. 3 illustrates a reactor 101 combining 3 compartments 201, 202 and 203 all connected to each other by a system of pipes equipped with valves 204, 205 and 206 in their bottom section. Each compartment 201, 202 and 203 comprises respectively an influent waste water pipe 31, 32 and 33, equipped respectively with control valves 131, 132 and 133, an effluent weir 41, 42 and 43, linked respectively to effluent pipes 51, 52 and 53 equipped respectively with effluent valves 151, 152 and 153. Compartments 201 and 202 are here running a biological step and a gas pressure 16 is applied in weirs 41 and 42. Compartment 203 is running a sedimentation step and pure water is flowing through baffle 83 into weir 43 as illustrated by the arrow 12.

In the active phase illustrated by FIG. 3, influent waste water is flowing through pipe 31 and valve 131 is open. Water is being biologically treated in compartment 201, under stirring and aeration (not illustrated). Valves 204 and 205 are open, so water flows from compartment 201 into compartment 202, where it is further treated by the micro-organisms, and then into compartment 203 where sedimentation occurs. The purified water, free from micro-organisms, towards the surface of the water in compartment 203 is allowed to flow out through baffle 83 into the weir 43 and pipe 53, the valve 153 is then open. A pressure of gas may be applied to weirs 41 and 42, and valves 151 and 152 are closed to prevent any water to flow out of compartments 201 and 202 through their respective weirs 41 and 42.

In such reactors, combining several compartments, influent water is flowing continuously in active phases, and intermediate phases enable to switch the function of one or more compartments between biological and sedimentation steps. For doing so, in the intermediate phase, when a biological reactor becomes a sedimentation reactor, some time has to be allowed for sedimentation before starting a new active phase. The lamellas greatly reduce this time, despite the fact that their presence will lead to a larger formation of floating elements. These floating elements however are hindered from flowing along with the pure water into the effluent channel formed by the covered weirs having a baffle. Such effluent channels have the additional advantage of allowing a pressure of gas to be applied, thus further preventing contamination of the weir by either contaminated water or floating elements during biological steps and eliminating the need of rinsing the weir. The lamellas and the cover of the weir therefore combine their effects to reduce the duration of intermediate phases and therefore increase the efficiency of the reactor. The floating elements are removed from the surface of the compartment by separate means. Traditionally, in round clarifiers, a skimming baffle attached to a moving bridge—same bridge used for raking the bottom of the clarifying tank to drive the microorganisms towards recycling pipes—is used to remove the floating elements. Similarly, in the plant of the invention, a skimming baffle, adapted to a square or rectangular tank, could be coupled to a bridge moving along a lateral direction at regular intervals of time to achieve removal of the floating elements. Surface rotating paddles may also be used, which would induce in the water a surface flow pushing the floating elements towards a dedicated weir connected with a separation system, like a dewatering drum, a flotation system or any other filtration system.

The invention claimed is:

1. A waste water treatment plant comprising:
    at least a multi-step water treatment reactor being a cyclic operating activated sludge system arranged for receiving influent waste water and running a continuous cycle of purification, for carrying out at least alternatively a biological step under stirring and/or aeration and a sedimentation step and for providing effluent pure water, by means of an effluent weir,
    means for increasing the sedimentation velocity comprising cross-lamellas, and
    means for hindering floating elements to get into the effluent weir comprising:
        a cover arranged over the weir for providing a baffle hindering floating elements to get through during both the biological and the sedimentation steps, and during the biological step, the baffle is under gas pressure from gas pressure applied inside the weir to avoid flow of the effluent out of the compartment.

2. The plant according to claim 1, wherein the reactor includes a single biological/sedimentation compartment.

3. The plant according to claim 1, wherein the reactor is divided in several connected compartments, each arranged for carrying out a biological step and/or a sedimentation step and including the baffle, the compartments being connected in the bottom section of the reactor.

4. The plant according to claim 2, wherein each compartment is arranged to put the effluent weir comprising the cover for providing the baffle under gas pressure to avoid flow of the effluent out of the compartment.

5. The plant according to claim 1, wherein the weir and the cover have each an L-shaped crossed section arranged top to bottom.

6. The plant according to claim 2, further comprising means to remove the floating elements.

7. The plant according to claim 3, wherein each compartment is arranged to put the effluent weir comprising the cover for providing the baffle under gas pressure to avoid flow of the effluent out of the compartment.

8. The plant according to claim 7, further comprising means to remove the floating elements.

9. The plant according to claim 7, wherein the weir and the cover have each an L-shaped crossed section arranged top to bottom.

10. The plant according to claim 9, further comprising means to remove the floating elements.

11. The plant according to claim 2, wherein the weir and the cover have each an L-shaped crossed section arranged top to bottom.

12. The plant according to claim 11, further comprising means to remove the floating elements.

13. The plant according to claim 3, wherein the weir and the cover have each an L-shaped crossed section arranged top to bottom.

14. The plant according to claim 13, further comprising means to remove the floating elements.

15. The plant according to claim 4, wherein the weir and the cover have each an L-shaped crossed section arranged top to bottom.

16. The plant according to claim 15, further comprising means to remove the floating elements.

17. The plant according to claim 3, further comprising means to remove the floating elements.

18. The plant according to claim 4, further comprising means to remove the floating elements.

19. The plant according to claim 5, further comprising means to remove the floating elements.

20. The plant according to claim 1, wherein the weir is configured to include pressurized gas so that the baffle is under gas pressure.

* * * * *